(12) United States Patent
Duane et al.

(10) Patent No.: US 7,111,172 B1
(45) Date of Patent: Sep. 19, 2006

(54) SYSTEM AND METHODS FOR MAINTAINING AND DISTRIBUTING PERSONAL SECURITY DEVICES

(75) Inventors: William Duane, Westford, MA (US); Peter Röstin, Tyresö (SE)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/356,600

(22) Filed: Jul. 19, 1999

(51) Int. Cl.
*H04K 9/00* (2006.01)
*G06F 11/30* (2006.01)

(52) U.S. Cl. .................. 713/182; 713/168; 713/170; 713/194; 380/25; 380/30; 380/277; 726/2; 726/8; 726/9; 726/15; 726/26

(58) Field of Classification Search ................ 713/201, 713/193, 185, 168, 170, 182, 194; 380/23, 380/25, 30, 277, 278; 726/2, 8, 9, 15, 18, 726/26
See application file for complete search history.

(56) References Cited

U.S. PATENT DOCUMENTS

| 4,309,569 | A | | 1/1982 | Merkle ................ 178/22.08 |
|---|---|---|---|---|
| 4,685,055 | A | | 8/1987 | Thomas ................... 364/200 |
| 4,755,940 | A | | 7/1988 | Brachtl et al. ............ 364/408 |
| 5,191,611 | A | * | 3/1993 | Lang ........................ 380/25 |
| 5,210,795 | A | * | 5/1993 | Lipner et al. ............. 380/23 |
| 5,237,614 | A | * | 8/1993 | Weiss ...................... 713/159 |
| 5,361,002 | A | | 11/1994 | Casper .................... 327/530 |
| 5,418,854 | A | * | 5/1995 | Kaufman et al. .......... 713/156 |
| 5,485,519 | A | | 1/1996 | Weiss ........................ 380/23 |
| 5,491,752 | A | * | 2/1996 | Kaufman et al. ............ 380/30 |
| 5,495,533 | A | * | 2/1996 | Linehan et al. ............ 713/155 |
| 5,497,421 | A | * | 3/1996 | Kaufman et al. ............ 380/23 |
| 5,586,260 | A | * | 12/1996 | Hu ........................ 395/200.2 |
| 5,604,801 | A | * | 2/1997 | Dolan et al. ................ 380/21 |
| 5,729,608 | A | * | 3/1998 | Janson et al. .............. 713/171 |
| 5,784,463 | A | * | 7/1998 | Chen et al. ................. 380/21 |
| 5,933,826 | A | * | 8/1999 | Ferguson ................... 707/9 |
| 5,950,195 | A | * | 9/1999 | Stockwell et al. ........... 707/4 |
| 6,064,736 | A | * | 5/2000 | Davis et al. ............... 713/155 |
| 6,170,058 | B1 | * | 1/2001 | Kausik ...................... 713/193 |
| 6,240,184 | B1 | | 5/2001 | Huynh et al. .............. 380/206 |
| 6,389,538 | B1 | * | 5/2002 | Gruse et al. ............... 713/194 |
| 6,424,718 | B1 | * | 7/2002 | Holloway ................... 380/27 |
| 2001/0034837 | A1 | * | 10/2001 | Kausik et al. ............ 713/185 |

FOREIGN PATENT DOCUMENTS

| EP | 0994599 A1 | 4/2000 |
|---|---|---|
| WO | WO 00/44172 | 7/2000 |

OTHER PUBLICATIONS

ViPN, personal Virtual Private Network Solution, Reported Sep. 3, 1997, Downloaded from Check Point web site, on Sep. 29, 2003.*
Key management for super-Distributed documents, IBM Technical Disclosure Bulletin, vol. 39, Iss. 4, pp. 193-196, Apr. 1996.*

(Continued)

*Primary Examiner*—Taghi T. Arani
(74) *Attorney, Agent, or Firm*—Wilmer Cutler Pickering Hale and Dorr LLP (57) ABSTRACT

This invention relates to methods and apparatus for securely accessing and providing information including the use of a personal security device on a client where the client is subject to compromise.

47 Claims, 9 Drawing Sheets

OTHER PUBLICATIONS

Patent Cooperation Treaty, International Search Report, International Application No. PCT/US00/19656, mailed on May 8, 2001, 7 pages.

Adams and Zuccherato, "*Internet X.509 Public Key Infrastructure Data Certification Server Protocols*", (pp. 1-13), [online], [retrieved on Jul. 8, 2001], retrieved from the Internet URL:http://www.ietf.org/proceedings/99jul/I-D/draft-ietf-pkix-dcs-00.txt, Sep. 1998.

Brainnard, "*SecurSight: An Architecture for Secure Information Access*", (9 pgs.), RSA Laboratories, 15th Annual Computer Security Applications Conference Dec. 6-10, 1999 Phoenix, Arizona [online], [retrieved on Aug. 10, 2001], retrieved from the Internet URL:http://www.acsac.org/1999/papers/fri-a-1030-brainard.pdf.

Freir, Karlton, and Kocher, "*The SSL 3.0 Protocol*", (pp. 1-62), [online], [retrieved on Jul. 10, 2001], retrieved from the Internet URL:http://home.netscape.com/eng/ssl3/draft302.txt, Nov. 1996.

Housley, Ford, Polk, and Solo, "*Internet X.509 Public Key Infrastructure: Certificate and CRL Profile*", RFC 2459, [online], [retrieved on Aug. 29, 2001], retrieved from the internet URL:http://www.ietf.org/rfc/rfc2459.txt, Internet Engineering Task Force, Jan. 1999.

Kohl and Neuman, "*The Kerberos Network Authentication Service (V5)*", (pp. 1-85), [online], [retrieved on Aug. 10, 2001], retrieved from the Internet URL:http://www.fafqs.org/rfcs/rfc1510.html, Sep. 1993.

Myers, Ankeney, Malpani, Galperin, and Adams, "*X.509 Internet Public Key Infrastructure Online: Certificate Status Protocol-OCSP*", (pp. 1-8), [online], [retrieved on Sep. 10, 2001], retrieved from the internet URL:http://www.ietf.org/rfc/rfc2560.txt, Jun. 1999.

RSA Laboratories, "*PKCS #8: Private Key Information Syntax Standard*", (pp. 1-5), An RSA Laboratories Technical Note, Version 1.2, Revised Nov. 1993.

RSA Laboratories, "*PKCS #11: Cryptographic Token Interface Standard*", (pp. 1-229), An RSA Laboratories Technical Note, Version 2.0, Apr. 1997.

RSA Laboratories, "*PKCS #12: Personal Information Exchange Syntax Standard*", (pp. 1-23), An RSA Laboratories Technical Note, Version 1.0, Jun. 1999.

Wahl, Howes, and Kille, "*Lightweight Directory Access Protocol (V30)*", (pp. 1-37), [online], [retrieved on Aug. 10, 2001], retrieved from the Internet URL:http://www.faqs.org/rfcs/rfc2251.html, Dec. 1997.

\* cited by examiner

SYSTEM AND METHODS FOR MAINTAINING AND DISTRIBUTING PERSONAL SECURITY DEVICES

BACKGROUND OF THE INVENTION

1. Field of the Invention

This invention relates to the field of cryptography, including user authentication, document authentication, symmetric key cryptography, public key cryptography, secure communications, secret sharing, and key distribution.

2. Description of the Related Art

Cryptography has become increasingly important with the increased presence of the Internet, an inherently insecure transmission medium. Cryptography enables methods of secure user authentication, which is a prerequisite to performing secure electronic commerce on the Internet.

Typical methods of user authentication are insecure and vulnerable to eavesdropping. For example, suppose that a user Alice wishes to log into a computer over the Internet. A typical authentication process requires Alice to enter her password. This password is typically entered and transmitted in the clear and may be easily intercepted by an eavesdropper Eve as it travels across the Internet, providing Eve with the information necessary to gain exactly the same access privileges as Alice. Cryptography provides secure authentication protocols allowing Eve to eavesdrop on the authentication information without providing her with the necessary information to gain the same access privileges as Alice.

Cryptographic methods of secure user authentication require the storage of sensitive information, typically on a medium such as the hard disk drive of a general purpose computer or the flash memory of a personal digital assistant. With the increasing portability and mobility of such hardware comes the increasing ease of its theft. In one illustrative example, a user travels with a laptop computer containing authentication information stored on its hard disk. This authentication information can be used to make a secure network connection, to log in to a remote host, and to sign email. If the laptop were to be stolen, the thief could then use this stolen information to perform further mischief by masquerading as the user.

One type of sensitive authentication information is a user's private key. A private key is a component of public key cryptography, which enables methods of user authentication as well as secure communications over unsecured channels. Public key cryptography employs a key pair comprising a public key and a private key. One key is used to encrypt a file and the other key is used to decrypt it. The key used to encrypt a file is not useful for subsequently decrypting it. In general, public key cryptography enables a user Alice to authenticate herself to another user Bob by encrypting data provided by Bob with her private key, creating a digital signature. Alice then sends the signature to Bob. Bob then uses Alice's public key to decrypt the signature, which he then compares to the plaintext. Alice is authenticated to Bob if the decrypted and plaintext data match. Implementations of public key cryptography include RSA, Diffie-Helman, ElGamal, and Elliptic Curve Cryptography ("ECC").

Another type of sensitive information is the output of an authentication token. In one implementation, an authentication token displays a number that changes periodically. The numbers displayed are elements in a pseudorandom sequence. Before the token is used, it is synchronized with a security server so that the security server subsequently knows what number is displayed on the token at any given time. When a user seeks access to a resource administered by the security server, the user sends the server the number currently displayed on the token. The server then authenticates the user by comparing the sent number with the number that the server expects the authentication token to currently display. If they match, the user is authenticated and granted access to the resource. An authentication token can be implemented in hardware or software. In one software implementation, an authentication token includes program code running on the user's laptop.

Another type of sensitive information is a key to a challenge-response protocol. In one implementation of this protocol, the key comprises a number known by the user and an authentication server. Instead of requesting the number directly, the authentication server sends the user an operand. The user performs a mathematical function using the operand and the key and sends the result back to the authentication server, which compares the user's answer with the expected answer. The mathematical function is designed so that it is impractical to discern the key from the operand and the result. A challenge-response authentication protocol can be implemented in software on the user's a general purpose computer.

Sensitive information for secure user authentication can be stored on a variety of hardware. For example, secure user authentication methods may be implemented on a workstation, a desktop computer, a laptop computer, a personal digital assistant, a smartcard, a universal serial bus ("USB") key, or specialized hardware. This specialized hardware can be small and portable, with form factors similar to a credit card, a gumdrop, or a school ring.

There is a need to protect sensitive information stored on a wide range hardware that is subject to several forms of physical compromise.

BRIEF SUMMARY OF THE INVENTION

The invention provides apparatus and methods for securely accessing and providing information. In one embodiment the invention relates to a method for securely providing information including the steps of receiving information identifying an encrypted personal security device, providing the encrypted personal security device, receiving authentication information, and providing decryption information for the personal security device responsive to the authentication information. In a further embodiment, the encrypted personal security device includes an encrypted key. In another embodiment, the encrypted personal security device includes information necessary to make a secure virtual private network connection. In another embodiment the method further includes the step of validating the authentication information. In another embodiment, the step of providing the encrypted personal security device includes the steps of retrieving and providing the personal security device. In a further embodiment, the retrieval step includes retrieving the personal security device from an authentication server. In another embodiment, the method further includes the step of storing the personal security device on a smartcard. In another embodiment, the method further includes the step of storing the personal security device in a volatile memory element.

In another aspect the invention relates to a method for accessing secure information including the steps of receiving an encrypted personal security device, receiving decryption information for the personal security device, and decrypting the personal security device. In one embodiment the method further includes the step of using the decrypted personal security device to access secure information. In another embodiment, the personal security device includes information necessary to make a secure network connection between a network client and a network server. In another embodiment, the personal security device includes information necessary to make a secure virtual private network connection. In another embodiment, the method further includes the steps of transmitting information identifying an encrypted personal security device and transmitting authentication information. In another embodiment, the method further includes the step of storing the personal security device on a smartcard. In another embodiment, the method further includes the step of storing the personal security device in a volatile memory element.

In another embodiment the invention relates to a method for allowing a network client secure access to information including the steps of requesting, by the network client, a personal security device from a network server, wherein the personal security device includes encrypted information necessary to make a secure network connection, forwarding, by the network server, the personal security device to the network client, and providing, by the network server, decryption information for the personal security device. In another embodiment, the personal security device includes information necessary to make a secure virtual private network connection. In another embodiment, the method further includes the steps of forwarding, by the network server, the request to an authentication server, querying, by the authentication server, a user databse with the request, returning, by the user database, a personal security device to the authentication server, and forwarding, by the authentication server, the personal security device to the network server. In another embodiment, the method further includes the steps of obtaining, by the client, authentication information from an authentication token, providing, by the client, the authentication information to the authentication server, confirming, by the authentication server, the validity of the authentication information, retrieving, by the network server, decryption information for the personal security device from a database, and providing, by the network server, decryption information for the personal security device to the client. In another embodiment, the method further includes the step of decrypting, by the client, the personal security device.

In another embodiment the invention relates to a device for providing secure access to information including a first receiver receiving information identifying an encrypted personal security device, a first transmitter providing the personal security device, a second receiver receiving authentication information, and a second transmitter providing decryption information for the personal security device responsive to the authentication information. In a further embodiment, the personal security device includes an encrypted key. In another embodiment, the personal security device includes information necessary to make a secure network connection between a network client and a network server. In another embodiment, the personal security device includes information necessary to make a secure virtual private network connection. In another embodiment, the device also includes an authenticator validating the authentication information. In another embodiment, the first receiver is the same as the second receiver. In another embodiment, the first transmitter is the same as the second transmitter.

In another aspect the invention relates to a device for accessing secure information including a first receiver receiving an encrypted personal security device, a second receiver receiving decryption information for the personal security device, and a decryptor decrypting the personal security device. In another embodiment, the personal security device includes information necessary to make a secure network connection between a network client and a network server. In another embodiment, the personal security device includes information necessary to make a secure virtual private network connection. In another embodiment, the device further includes a first transmitter transmitting information identifying an encrypted personal security device, and a second transmitter transmitting authentication information. In another embodiment, the first transmitter is the same as the second transmitter. In another embodiment, the device also includes a smartcard storing the decryption information. In another embodiment, the device also includes a volatile memory element storing the decryption information. In another embodiment, the first receiver is the same as the second receiver.

In another embodiment the invention relates to a system for providing secure access to information including a network client including a volatile memory element and a network server storing an encrypted personal security device in a server memory element, the personal security device including encrypted information. In another embodiment, the system further includes a smartcard having a volatile memory element storing the personal security device. In another embodiment, the system further includes decrypted information for forming a secure network connection between the client and the server wherein the decrypted information is derived from applying the decryption information to the personal security device. In a further embodiment, the decryption information is stored in the volatile memory element. In a further embodiment, the decrypted information is stored in the volatile memory element. In another embodiment, the network is a virtual private network. In a further embodiment, the encrypted information includes information necessary for forming a secure network connection the the client and the server. In a further embodiment, the system further includes an authentication token, wherein the token is capable of providing authentication information, and an authentication server, wherein the authentication server includes a user database, wherein the user database includes decryption information for the personal security device, and wherein the authentication server is capable of providing the decryption information upon receipt of the authentication information.

BRIEF DESCRIPTION OF THE SEVERAL VIEWS OF THE DRAWINGS

The foregoing and other objects, features and advantages of the present invention, as well as the invention itself, will be more fully understood from the following description of preferred embodiments, when read together with the accompanying drawings, in which.

DETAILED DESCRIPTION OF THE INVENTION

For the purposes of this invention, the term "personal security device" refers to encrypted sensitive information that may be stored on devices subject to physical compromise. "Personal security device" may also be used as a synecdoche to refer to the hardware storing this encrypted sensitive information. In one embodiment of the invention, the personal security device can only be decrypted with decryption information, known as a key.

For the purposes of this invention, "non-volatile storage medium" refers to any medium in which data persists when power is not supplied to the device on which the medium resides. Examples of non-volatile storage media include disks, tapes, compact disc read-only memory ("CD-ROM"), digital versatile disc ("DVD"), flash memory, erasable-programmable read-only memory ("EPROM") and read-only memory ("ROM"). For the purposes of this invention, "volatile storage medium" refers to any medium in which data is stored in a transitory manner or data is lost when power is removed from the medium. An example of a volatile storage medium is random-access memory ("RAM"). In a typical embodiment, volatile storage media are less susceptible to physical compromise than non-volatile storage media.

For the purposes of this invention, the term "physical compromise" encompasses any means by which an adversary may gain access to information on a user's system. For example, a laptop computer can be stolen and its contents accessed. Physical compromise also encompasses an adversary may gaining entrance to an office and copying sensitive contents of a target computer onto a removable storage medium such as a floppy disk or removable cartridge. Physical compromise also encompasses an adversary transmitting sensitive information from a target computer to one of the adversary's computers over a computer network such as the Internet. Physical compromise also encompasses the use of cracking methods including viruses and trojan horses. For example, a desktop system can be infected with a virus that seeks out sensitive information and transmits what it finds to an adversary over the Internet. Alternatively, an adversary can exploit a security hole in an operating system to gain access to that system directly. One example of a security hole exploit is known as Back Orifice, which provides unauthorized access to systems running Microsoft's Windows NT operating system.

For the purposes of this invention, the term "authentication token" refers to a device or program providing authentication information to a user that is determined based on secret information shared by the authentication token and an authentication server. In one embodiment, the authentication token is implemented as code running on the user's general purpose computer. In an alternate embodiment, the authentication token is implemented on specialized hardware.

Figure 1:
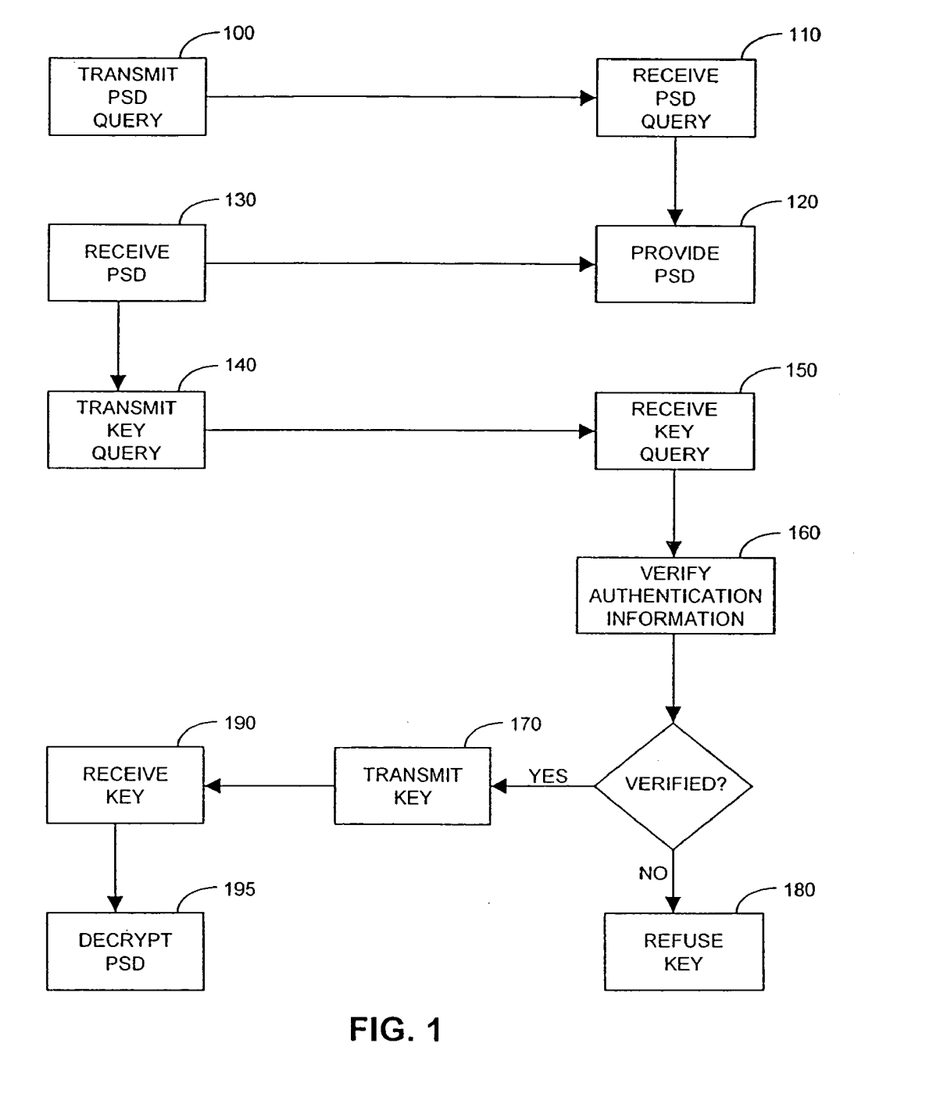
FIG. 1 is a flowchart illustrating the interaction between a client and a server.

Referring to FIG. 1, and in brief overview, a system is provided

One embodiment of the invention, as illustrated in FIG. 1, includes a client that interacts with a server to gain access to sensitive information. The client first transmits a personal security device query to the server (Step 100). In one embodiment, this query includes information necessary to uniquely identify a specific personal security device. In an alternate embodiment, the query includes a request to generate a new personal security device. In one embodiment, the query is received via a computer network. In a further embodiment, the computer network is a local area network. In an alternate embodiment, the computer network is a wide area network. In a further embodiment, the wide area network is the Internet. In one embodiment, the query is received via an open or unsecured connection. In an alternate embodiment, the query is received via a secured connection. In a further embodiment, the connection is secured by the SSL protocol. In one embodiment, the query does not include any authentication information.

The server receives the personal security device query (Step 110), and provides the personal security device to the client (Step 120). In one embodiment, the server provides the personal security device by transmitting it over a computer network. In a further embodiment, the computer network is a local area network. In an alternate embodiment, the computer network is a wide area network. In a further embodiment, the wide area network is the Internet. In one embodiment, the personal security device is transmitted over an open or unsecured connection. In an alternate embodiment, the personal security device is transmitted over a secured connection. In a further embodiment, the connection is secured by the SSL protocol.

The client then receives the transmitted personal security device (Step 130) and transmits a key query requesting the key to the personal security device (Step 140). The key query includes an unique identifier for the personal security device to be decrypted. The key query also includes authentication information. In one embodiment, the authentication information is the output of an authentication token. In an alternate embodiment, the authentication information is a digitally-signed document. In yet another alternate embodiment, the authentication information is a passphrase. In yet another alternate embodiment, the authentication information is a response to a challenge. In yet another alternate embodiment, the authentication information includes biometric information. In one embodiment, the key query is transmitted via a computer network. In a further embodiment, the computer network is a local area network. In an alternate embodiment, the computer network is a wide area network. In a further embodiment, the wide area network is the Internet. In one embodiment, the key query is transmitted via an open or unsecured connection. In an alternate embodiment, the key query is transmitted via a secured connection. In a further embodiment, the connection is secured by the SSL protocol.

The server then receives the key query (Step 150) and determines if the authentication information is correct (Step 160). In one embodiment, the server determines if the authentication information matches the information the server expects to be displayed on an authentication token. In an alternate embodiment, the server verifies the authentication information's digital signature. In yet another alternate embodiment, the server determines if the authentication information matches a passphrase. In yet another alternate embodiment, the server determines if the authentication information is a correctly calculated response to a challenge. In yet another alternate embodiment, the server determines if the authentication information matches a user's biometric information.

If the authentication information is correct, the server provides the key to the personal security device (Step 170). Otherwise the server refuses to provide the key (Step 180). In one embodiment, the server provides the key by transmitting it over a computer network. In a further embodiment, the computer network is a local area network. In an alternate embodiment, the computer network is a wide area network. In a further embodiment, the wide area network is the Internet. In one embodiment, the key is transmitted over an open or unsecured connection. In an alternate embodiment, the key is transmitted over a secured connection. In a further embodiment, the connection is secured by the SSL protocol.

The client receives the key (Step 190) and uses it to decrypt the personal security device (Step 195) thereby gaining access to its contents. In one embodiment, the key is a symmetric key and decryption is performed using a symmetric cipher such as RC4, A4, DES, RC5, Blowfish, or RC6. In an alternate embodiment, the key is a first asymmetric key of a key pair, the personal security device was encrypted with a second key of a key pair, and the decryption is performed using a public-key cryptographic cipher.

Figure 2:
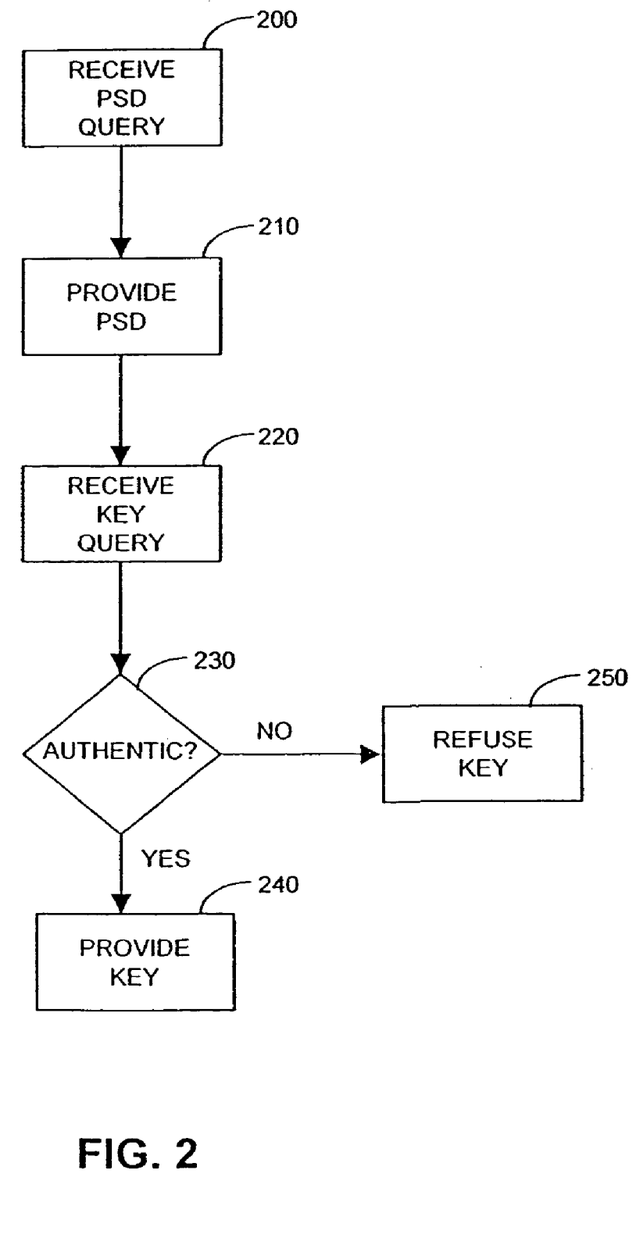
FIG. 2 is a flowchart illustrating steps a server undertakes to securely provide information.

In one embodiment of this invention, the personal security device may be distributed openly and without any requirement for authentication. In a further embodiment, the key to the personal security device is not distributed openly, but only in response to proper authentication. FIG. 2 illustrates steps taken by a server of this embodiment. The server receives a query for a personal security device (Step 200). In one embodiment, this query includes information necessary to uniquely identify a specific personal security device. In an alternate embodiment, the query includes a request to generate a new personal security device. In one embodiment, the query is received via a computer network. In a further embodiment, the computer network is a local area network. In an alternate embodiment, the computer network is a wide area network. In a further embodiment, the wide area network is the Internet. In one embodiment, the query is received via an open or unsecured connection. In an alternate embodiment, the query is received via a secured connection. In a further embodiment, the connection is secured by the SSL protocol. In one embodiment, the query does not include any authentication information.

The server then provides the personal security device (Step 210). In one embodiment, the server provides the personal security device by transmitting it over a computer network. In a further embodiment, the computer network is a local area network. In an alternate embodiment, the computer network is a wide area network. In a further embodiment, the wide area network is the Internet. In one embodiment, the personal security device is transmitted over an open or unsecured connection. In an alternate embodiment, the personal security device is transmitted over a secured connection. In a further embodiment, the connection is secured by the SSL protocol.

The server then receives a key query (Step 220). The key query includes an unique identifier for the personal security device to be decrypted. The key query also includes authentication information. In one embodiment, the authentication information is the output of an authentication token. In an alternate embodiment, the authentication information is a digitally-signed document. In yet another alternate embodiment, the authentication information is a passphrase. In yet another alternate embodiment, the authentication information is a response to a challenge. In yet another alternate embodiment, the authentication information includes biometric information. In one embodiment, the key query is received via a computer network. In a further embodiment, the computer network is a local area network. In an alternate embodiment, the computer network is a wide area network. In a further embodiment, the wide area network is the Internet. In one embodiment, the key query is received via an open or unsecured connection. In an alternate embodiment, the key query is received via a secured connection. In a further embodiment, the connection is secured by the SSL protocol.

The server then determines if the authentication information is correct (Step 230). In one embodiment, the server determines if the authentication information matches the information the server expects to be displayed on an authentication token. In an alternate embodiment, the server verifies the authentication information's digital signature. In yet another alternate embodiment, the server determines if the authentication information matches a passphrase. In yet another alternate embodiment, the server determines if the authentication information is a correctly calculated response to a challenge. In yet another alternate embodiment, the server determines if the authentication information matches a user's biometric information.

If the authentication information is correct, the server provides the key to the personal security device (Step 240). Otherwise the server refuses to provide the key (Step 250). In one embodiment, the server provides the key by transmitting it over a computer network. In a further embodiment, the computer network is a local area network. In an alternate embodiment, the computer network is a wide area network. In a further embodiment, the wide area network is the Internet. In one embodiment, the key is transmitted over an open or unsecured connection. In an alternate embodiment, the key is transmitted over a secured connection. In a further embodiment, the connection is secured by the SSL protocol.

Methods of providing proper authentication include but are not limited to entering a password, successfully completing a challenge-response protocol, entering data from an authentication token, and biometric authentication. Characterisitics for biometric authentication can include fingerprints, voice prints, retinal scan, facial features, or the measurement of any physical characteristic associated with a user to be authenticated.

Figure 3:
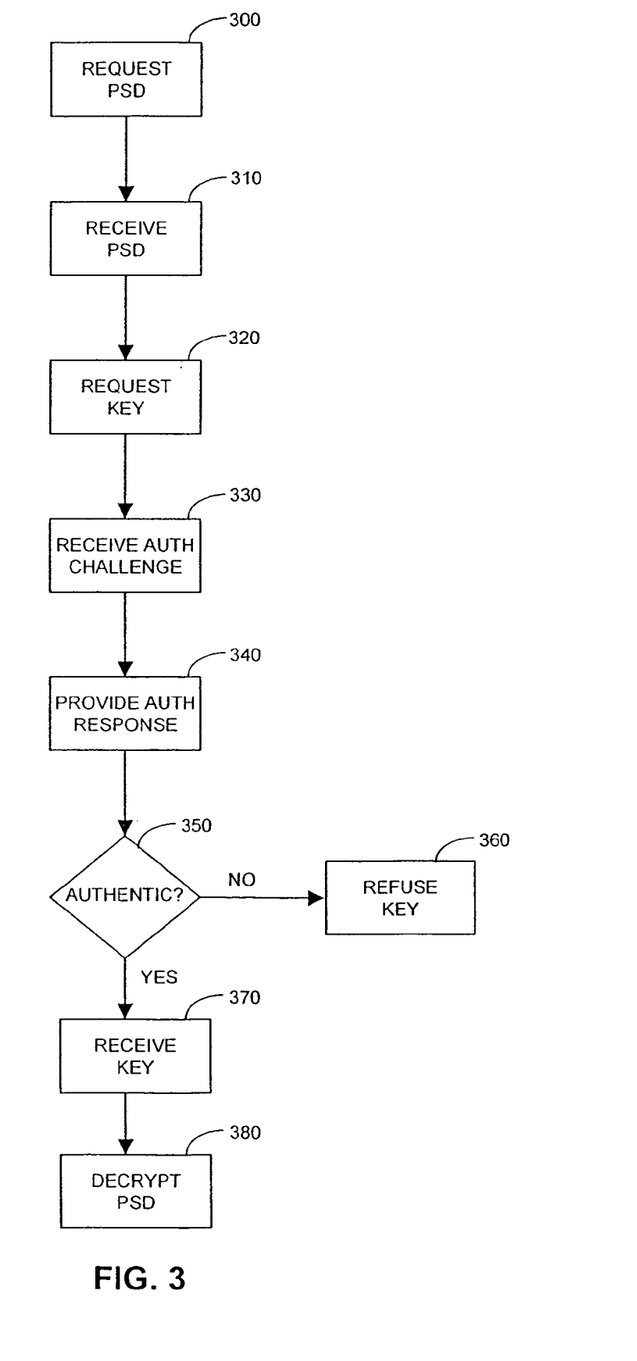
FIG. 3 is a flowchart illustrating steps a client undertakes performing a challenge-response protocol for accessing information.

FIG. 3 illustrates an embodiment employing a challenge-response protocol. A client requests a specific personal security device by sending a personal security device query (Step 300). In one embodiment, this query includes information necessary to uniquely identify a specific personal security device. In an alternate embodiment, the query includes a request to generate a new personal security device. In one embodiment, the query is received via a computer network. In a further embodiment, the computer network is a local area network. In an alternate embodiment, the computer network is a wide area network. In a further embodiment, the wide area network is the Internet. In one embodiment, the query is received via an open or unsecured connection. In an alternate embodiment, the query is received via a secured connection. In a further embodiment, the connection is secured by the SSL protocol. In one embodiment, the query does not include any authentication information.

The client then receives the personal security device (Step 310). In one embodiment, the client receives the personal security device over a computer network. In a further embodiment, the computer network is a local area network. In an alternate embodiment, the computer network is a wide area network. In a further embodiment, the wide area network is the Internet. In one embodiment, the personal security device is received over an open or unsecured connection. In an alternate embodiment, the personal security device is received over a secured connection. In a further embodiment, the connection is secured by the SSL protocol.

The client then requests the key to the personal security device by transmitting a key query (Step 320). The key query includes an unique identifier for the personal security device to be decrypted. In one embodiment, the key query is transmitted via a computer network. In a further embodiment, the computer network is a local area network. In an alternate embodiment, the computer network is a wide area network. In a further embodiment, the wide area network is the Internet. In one embodiment, the key query is transmitted via an open or unsecured connection. In an alternate embodiment, the key query is transmitted via a secured connection. In a further embodiment, the connection is secured by the SSL protocol.

Next, the client receives an authentication challenge (Step 330). In one embodiment, the authentication challenge is an operand generated by the server, where the proper response is the result of performing a mathematical function on the operand and a secret number. In a further embodiment, the mathematical function is a one-way function, such that it is infeasible to determine the secret number from the operand and the result. In one embodiment, the authentication challenge is received via a computer network. In a further embodiment, the computer network is a local area network. In an alternate embodiment, the computer network is a wide area network. In a further embodiment, the wide area network is the Internet. In one embodiment, the authentication challenge is received via an open or unsecured connection. In an alternate embodiment, the authentication challenge is received via a secured connection. In a further embodiment, the connection is secured by the SSL protocol.

Next, the client provides a response to the authentication challenge (Step 340). In one embodiment, the response is generated by performing the mathematical function on the operand and the secret number. In one embodiment, the client provides the response by transmitting it over a computer network. In a further embodiment, the computer network is a local area network. In an alternate embodiment, the computer network is a wide area network. In a further embodiment, the wide area network is the Internet. In one embodiment, the response is transmitted over an open or unsecured connection. In an alternate embodiment, the response is transmitted over a secured connection. In a further embodiment, the connection is secured by the SSL protocol.

The response is then validated (Step 350). If the response is authentic, then the client is send the key (Step 370) which the client then uses to decrypt the personal security device (Step 380) and gain access to its contents. If the response is not authentic, then the client is refused the key (Step 360). In one embodiment, the key is a symmetric key and decryption is performed using a symmetric cipher such as RC2, RC5, DES, Twofish, A5, or RC4. In an alternate embodiment, the key is a first asymmetric key of a key pair, the personal security device was encrypted with a second key of a key pair, and the decryption is performed using a public-key cryptographic cipher such as RSA, Diffie-Helman, ElGamal or Elliptic Curve Cryptography ("ECC"). In one embodiment, the key is received via a computer network. In a further embodiment, the computer network is a local area network. In an alternate embodiment, the computer network is a wide area network. In a further embodiment, the wide area network is the Internet. In one embodiment, the key is received via a secured connection. In a further embodiment, the connection is secured by the SSL protocol.

Figure 4:
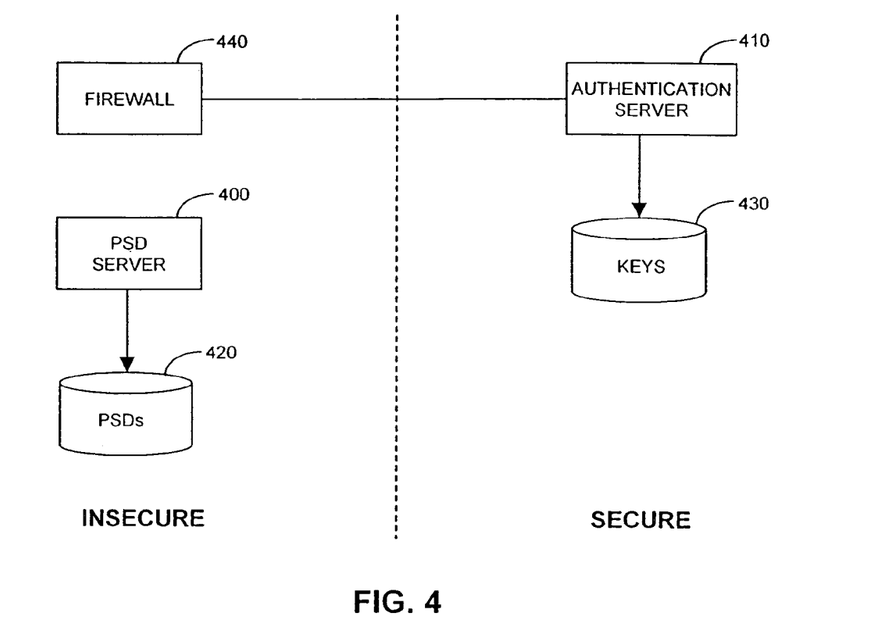
FIG. 4 is a schematic illustration of a security regime.

The personal security device server does not have to be the same as the authentication server. The embodiment in FIG. 4 illustrates the separation of the personal security device server 400 from the authentication server 410. The personal security device server 400 is in operative association with a personal security device database 420. The personal security device server 400 provides the contents of the personal security device database 420 without requiring authentication. In this embodiment, the contents of the personal security device database 420 can be considered public information. The authentication server 410 is in operative association with a key database 430. The information in the key database 430 is sensitive information which must be kept secure and is only given out in response to proper authentication. Optionally, the authentication server 410 and the key database 430 can be further protected by being placed behind a firewall 440.

Figure 5:
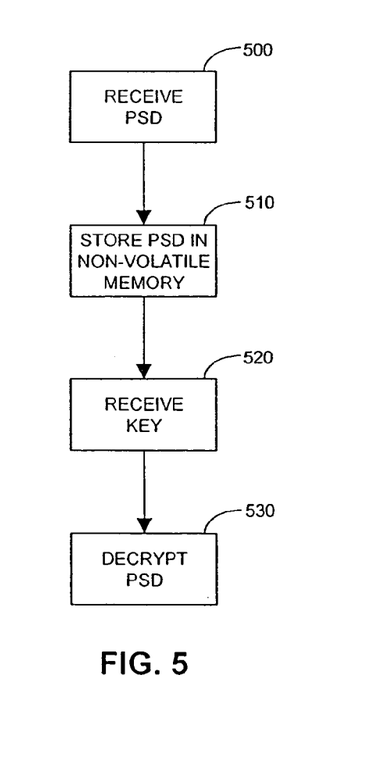
FIG. 5 is a flowchart illustrating steps a client undertakes to securely receive and access information.

In one embodiment of the invention, a user requests and receives a personal security device from a server, which the user then stores in a non-volatile storage medium such as a hard disk drive or flash memory. In a further embodiment, the user requests the key to the personal security device while providing proper authentication. In this embodiment, the user stores the key in a volatile storage medium, such as random access memory ("RAM"). In yet a further embodiment, the user decrypts the personal security device with the key and stores the decrypted sensitive information in a volatile storage medium. FIG. 5 illustrates the steps taken by a user or client of this embodiment. The client receives a personal security device (Step 500). In one embodiment, the client receives the personal security device over a computer network. In a further embodiment, the computer network is a local area network. In an alternate embodiment, the computer network is a wide area network. In a further embodiment, the wide area network is the Internet. In one embodiment, the personal security device is received over an open or unsecured connection. In an alternate embodiment, the personal security device is received over a secured connection. In a further embodiment, the connection is secured by the SSL protocol.

The personal security device is then stored on the client on a non-volatile storage medium (Step 510). In one embodiment, the non-volatile storage medium is a disk drive such as a hard disk, a floppy disk, or a removable cartridge such as a Zip drive. In an alternate embodiment, the non-volatile storage medium is memory such as flash memory or eraseable programmable read-only memory ("EPROM") where the contents of the memory are retained even if power is removed.

The client then receives the key to the personal security device (Step 520), typically in response to successful authentication. In one embodiment, the key is received via a computer network. In a further embodiment, the computer network is a local area network. In an alternate embodiment, the computer network is a wide area network. In a further embodiment, the wide area network is the Internet. In one embodiment, the key is received via a secured connection. In a further embodiment, the connection is secured by the SSL protocol.

The client then uses the key to decrypt the personal security device and gain access to its contents (Step 530). In this embodiment, the key and the decrypted contents are stored in the client's volatile storage medium. In one embodiment, the key is a symmetric key and decryption is performed using a symmetric cipher. In an alternate embodiment, the key is a first asymmetric key of a key pair, the personal security device was encrypted with a second key of a key pair, and the decryption is performed using a public-key cryptographic cipher.

Figure 6:
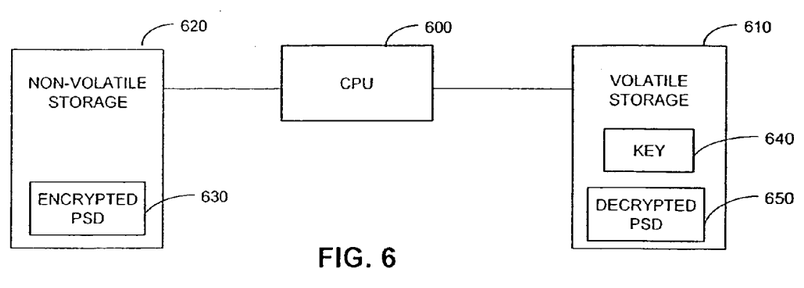
FIG. 6 is a schematic illustration of a hardware embodiment used to store and access a personal security device.

FIG. 6 illustrates the hardware of an embodiment used to store and access a personal security device and its contents. The hardware includes a central processing unit ("CPU") 600 in operative association with volatile storage 610 and non-volatile storage 620. In this embodiment, an encrypted personal security device 630 is stored in the non-volatile storage 610. When a user wishes to access the contents of the personal security device 630, a key 640 is stored in the volatile storage 610. The CPU 600 then uses the key 640 to decrypt the contents of the personal security device and store the decrypted contents 650 in the volatile storage 610.

Figure 7:
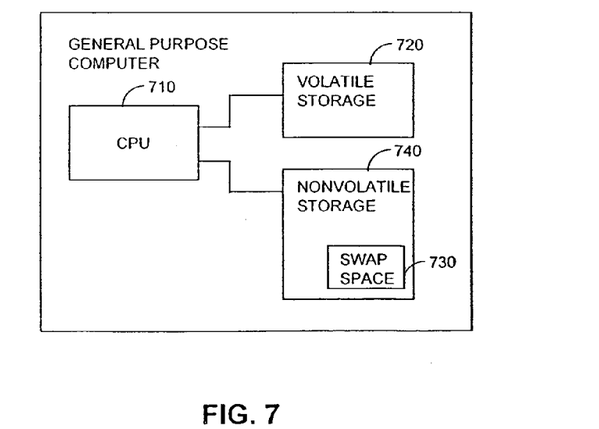
FIG. 7 is a schematic illustration of a hardware embodiment used to store and access a personal security device.

Some general purpose computers use non-volatile disk storage to supplement volatile random access memory ("RAM") storage. Referring to FIG. 7, a general purpose computer 700 includes a central processing unit ("CPU") 710 in operative association with volatile RAM 720 and a non-volatile disk drive 740. The disk drive 740 includes swap space 730. When sections of RAM 720 aren't being used, their contents are "swapped out" into the swap space 730 so that the RAM 720 can be used for other purposes. When a user wishes to access those contents, they are swapped back into the RAM 720. Because the use of swap space 730 writes the contents of volatile storage 720 into non-volatile storage 740, it is desirable to erase sensitive information from volatile storage 720 as soon as it is finished being used. Otherwise, unused sensitive information could be written out to nonvolatile swap space 730.

Figure 8:
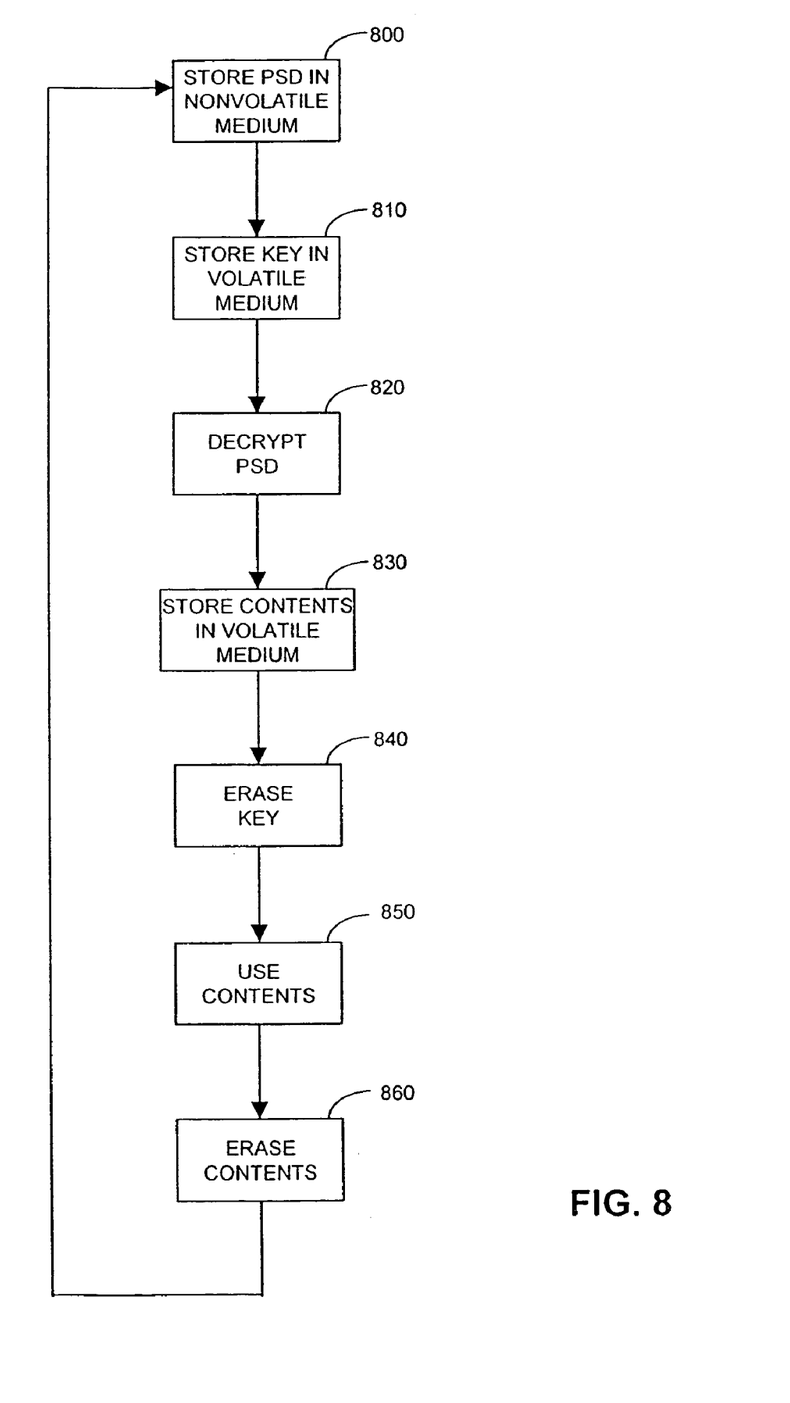
FIG. 8 is a flowchart illustrating steps to erase sensitive information after use.

In one embodiment, illustrated in the flowchart of FIG. 8, the information stored in the volatile storage medium is erased after use. First, the personal security device is stored in a non-volatile storage medium (Step 800). In one embodiment, the personal security device is stored by a user after having been provided by a server. In an alternate embodiment, the personal security device is stored in the non-volatile storage medium before the medium is distributed to the user.

Next, the key to the personal security device is stored in a volatile medium (Step 810). In one embodiment, the key is obtained from an authentication server. In an alternate embodiment, the key is directly entered by a user.

The key is then used to decrypt the personal security device (Step 820). In one embodiment, the key is a symmetric key and decryption is performed using a symmetric cipher. In an alternate embodiment, the key is a first asymmetric key of a key pair, the personal security device was encrypted with a second key of a key pair, and the decryption is performed using a public-key cryptographic cipher. The decrypted contents of the personal security device are stored in volatile memory (Step 830).

After being used to perform decryption, the key is erased from volatile memory (Step 840). In one embodiment, the key is erased by zeroing out the memory location where the key was stored. If this memory location is subsequently swapped out, the key will not be stored on a non-volatile medium.

The user then uses the decrypted contents of the personal security device (Step 850). After the user is finished with the contents, the contents are erased from volatile memory (Step 860). In one embodiment, the contents are erased by zeroing out the memory location where the contents were stored. If this memory location is subsequently swapped out, the contents will not be stored on a non-volatile medium. If the user wishes to subsequently use the contents (Step 850), Steps 810–840 must be repeated.

The encrypted sensitive information stored in a personal security device may include, but is not limited to, information necessary for forming a secure network connection, user authentication information, a symmetric encryption key, a private key, a public key certificate, a password or passphrase, contact information such as a name and address, a credit card number, an account number with a financial institution, a personal identification number ("PIN"), a medical record, biometric information, a transaction record, and a map revealing the location of a resource, or combinations thereof. A secure network connection may include a virtual private network ("VPN") connection. The information necessary for forming a secure network connection may include, but is not limited to, a symmetric encryption key and a private key.

In one embodiment, known as symmetric key wrapping, a personal security device includes a symmetrically encrypted file along with the symmetric key used to encrypt it. In this embodiment, the symmetric key is itself encrypted by a second key, which may be a symmetric or a public or private key. This second key is the key to the personal security device of this embodiment.

EXAMPLE 1

Figure 9:
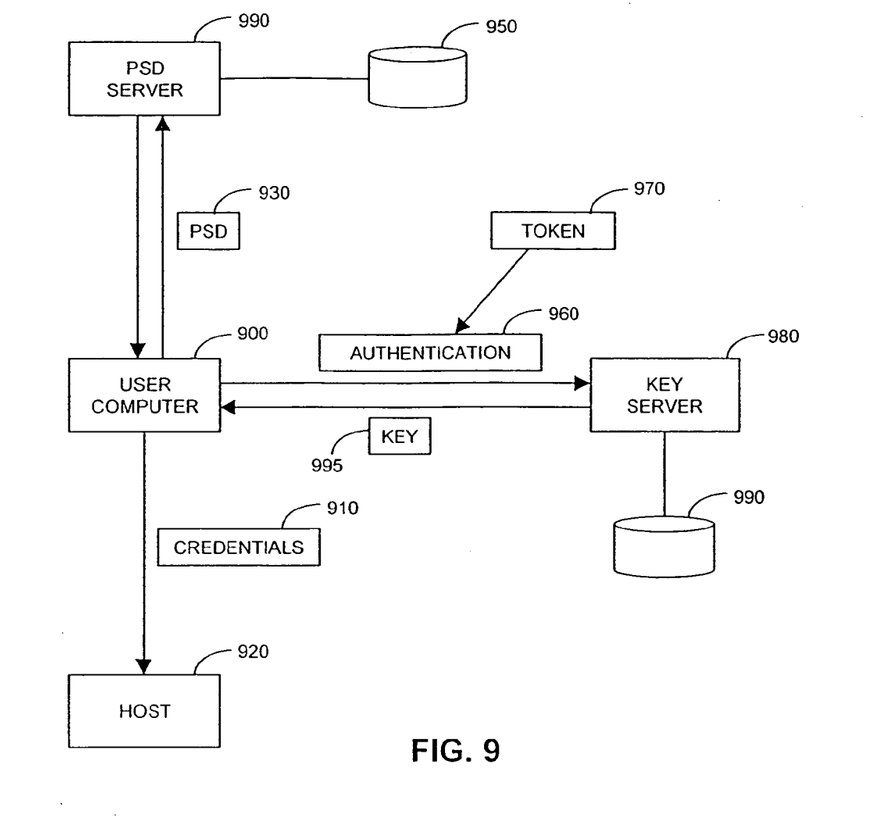
FIG. 9 is a schematic illustration of a system for securely providing information.

In this example, which is illustrated in FIG. 9, a user wishes to use a computer 900 to present credentials 910 such as a public key certificate or a digitally signed document to a host 920. The user first obtains a personal security device 930 from a personal security device server 940. In this embodiment, the personal security device 930 includes the user's encrypted credentials. The personal security device server 940 includes a personal security device database 950. The user then retrieves authentication information 960 from a token 970 and provides the authentication information 960 to an authentication server 980. The authentication server 980 is in operative association with a key database 990. If the authentication server 980 determines that the authentication information 960 is correct, the authentication server 980 then provides a key 995 to the personal security device 930. The computer 900 then employs the key 995 to decrypt the personal security device 930 and gain access to the user's credentials 910, which it then presents to the host 920.

In an alternate embodiment, the personal security device server 940 and the authentication server 980 can be the same server. In another alternate embodiment, the personal security device 930 comprises the user's private key with which the user generates the credentials 910.

EXAMPLE 2

Figure 10:
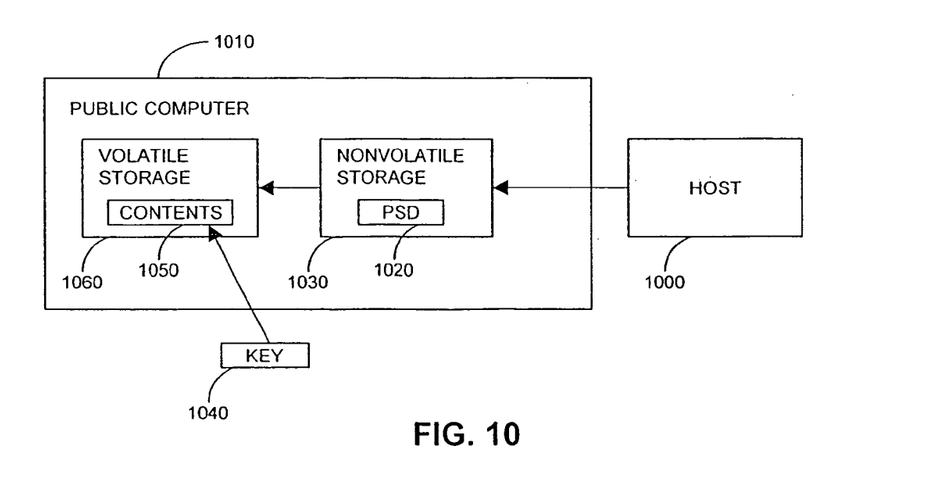
FIG. 10 is a schematic illustration of a workstation storing and decrypting a personal security device.

In this example, as illustrated in FIG. 10, a user wishes to form a secure network connection to a host computer 1000 from a public computer 1010. An example of a public computer is a workstation in a university's computing cluster. The user first obtains a personal security device 1020 containing encrypted information necessary for making a secure network connection, which the user then stores on a non-volatile medium 1030 such as the public computer's disk drive. In this example, the personal security device 1020 is obtained directly from the host computer 1000, but it may also be obtained from a separate computer such as an authentication server.

The user then applies a key 1040 to decrypt the contents 1050 of the personal security device 1020. The decrypted contents 1050 reside in volatile storage 1060. In this example, the key 1040 is a passphrase that the user has memorized. In an alternative embodiment, the key 1040 is obtained from an authentication token.

In this example, the personal security device 1020 may persist on the public computer, such that a subsequent user is able to read it. However, since the neither the key 1040 nor the decrypted contents 1050 of the personal security device 1020 persist, subsequent users cannot exploit the contents of the personal security device 1020.

EXAMPLE 3

Figure 11:
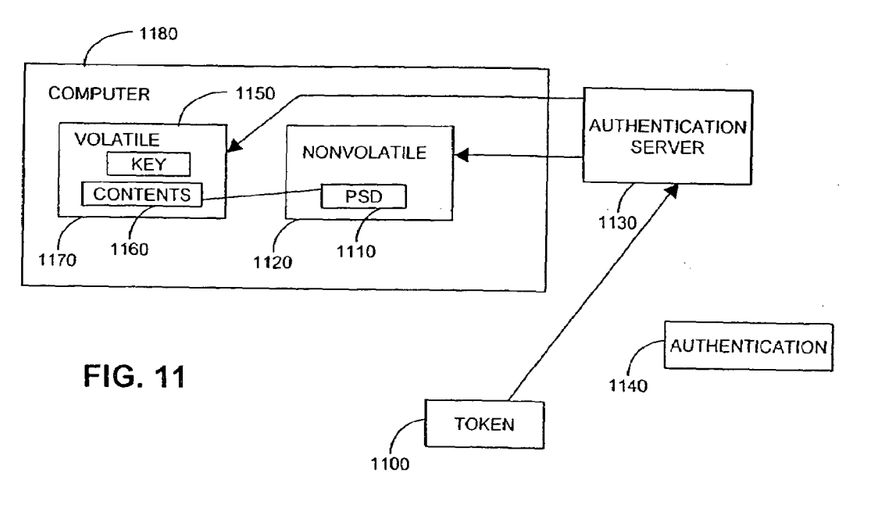
FIG. 11 is a schematic illustration of a system for securely providing a key in response to authentication.

In this example, as illustrated in FIG. 11, a user with an authentication token 1100 wishes to access the information in a personal security device 1110 stored on the hard disk drive 1120 of the user's computer. When the user wishes to decrypt the information stored in the personal security device 1110, the user queries an authentication server 1130 and presents authentication information 1140 from the authentication token 1100 to the authentication server 1130. Upon receiving proper authentication 1140, the authentication server 1130 then provides the user with a key 1150, which is then used to decrypt the contents 1160 of the personal security device.

In this example, the key 1150 and the decrypted contents 1160 are only maintained in volatile RAM 1170 and never written out to non-volatile disk 1120. Thus when the user turns off or resets the computer 1180, the key 1150 and decrypted contents 1160 are no longer accessible on the computer 1180. If the user wishes to access the contents 1160 of the personal security device 1110 again after cycling the power or resetting the computer 1180, the user has to repeat the authentication process described above. In a further embodiment, the key 1150 and decrypted contents 1160 are removed from volatile RAM 1170 when they are no longer being used. For example, the volatile RAM 1170 containing the key 1150 is zeroed out after decryption is complete, and the volatile RAM 1170 containing the decrypted contents 1160 is zeroed out after the user is finished with it.

If the user's computer 1180 is stolen or otherwise physically compromised, an adversary cannot exploit the contents of the personal security device 1110.

EXAMPLE 4

Figure 12:
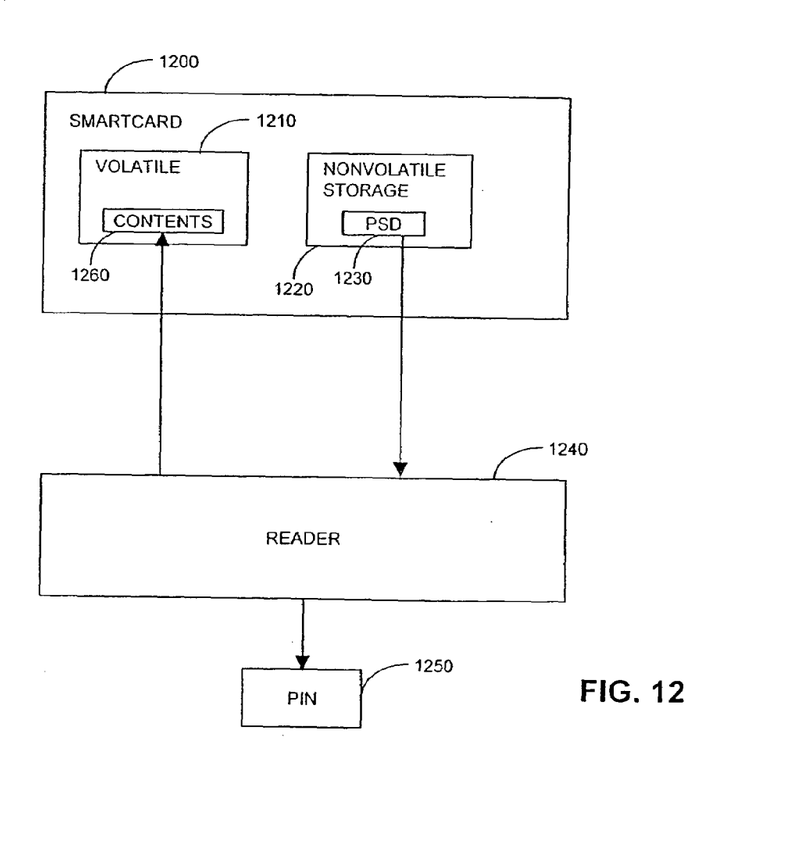
FIG. 12 is a schematic illustration of a smartcard and a smartcard reader.

In this example, as illustrated in FIG. 12, a user with a smartcard 1200 wishes to perform an authentication function. The smartcard includes volatile 1210 and non-volatile 1220 memory. A personal security device 1230 is stored in the smartcard's non-volatile memory 1220. The smartcard 1200 receives power when it is inserted into a smartcard reader 1240; when the smartcard 1200 is removed from the reader 1240, the contents of its volatile memory 1210 are lost. The user inserts the smartcard 1200 into the reader 1240 and provides the reader 1240 with a key such as a PIN 1250.

The PIN 1250 is used to decrypt the personal security device 1230. The decrypted contents 1260 are stored in the smartcard's volatile memory 1210, which the user employs for authentication functions such as digital signatures. When finished, the user removes the smartcard 1200 from the card reader 1240, erasing the sensitive contents 1260 stored in the smartcard's volatile memory 1210.

If the smartcard 1200 is lost or stolen, the information in its personal security device 1230 cannot be exploited by a finder or thief.

EXAMPLE 5

Figure 13:
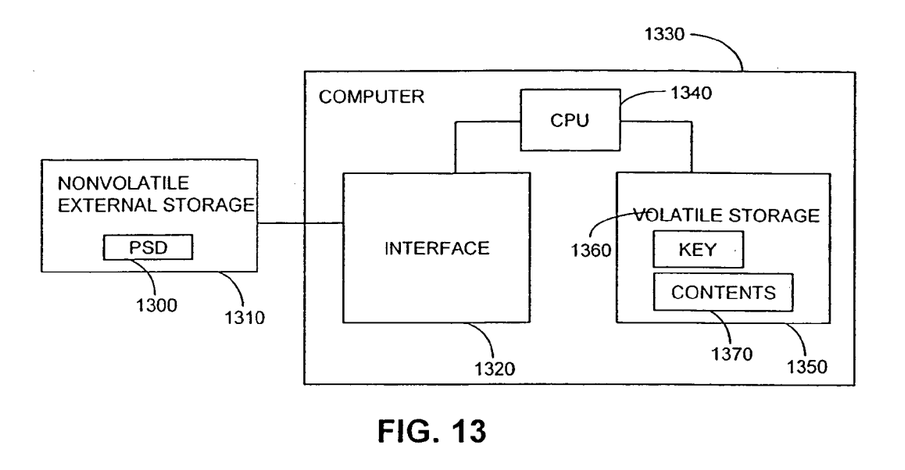
FIG. 13 is a schematic illustration of a personal security device stored in an external non-volatile medium.

In this example, as illustrated in FIG. 13, the personal security device 1300 is stored in non-volatile external storage device 1310, which is in operative association with an interface 1320 of a computer 1330. The interface 1320 is in operative association with a central processing unit ("CPU") 1340, which is in operative association with a volatile storage medium 1350. The key 1360 to the personal security device 1300 is stored in the volatile storage medium 1350. The decrypted contents 1370 of the personal security device 1300 is stored in the volatile storage medium 1350.

In one embodiment, the non-volatile external storage device 1310 is a cartridge storing the personal security device 1300 in read only memory ("ROM"). In a further embodiment, the non-volatile external storage device 1300 is a Personal Computer Memory International Association ("PCMCIA") card and the interface 1320 is a PCMCIA slot. In an alternate embodiment, the non-volatile external storage device 1300 is a universal serial bus ("USB") key and the interface 1320 is a USB port. In another alternate embodiment, the non-volatile external storage device 1300 is a card with a magnetic strip and the interface 1320 is a magnetic card reader. In yet another alternate embodiment, the non-volatile external storage device 1300 is a disk and the interface 1320 is a disk drive. In a further embodiment, the disk is a floppy disk and the disk drive is a floppy disk drive. In an alternate further embodiment, the disk is a CD-ROM and the disk drive is a CD-ROM drive. In another alternate embodiment, the disk is a Zip disk and the disk drive is a Zip drive.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for securely providing information comprising the steps of:
   (a) at a storage server, receiving from a client information identifying a personal security device;
   (b) in response to receiving said information identifying said personal security device, sending from the storage server to the client said personal security device;
   (c) at an authentication server, receiving authentication information from the client; and
   (d) responsive to said authentication information, sending from a key server to the client decryption information for decrypting said personal security device.

2. The method of claim 1, further comprising implementing the storage server and the authentication server on the same computer.

3. The method of claim 1, further comprising implementing the authentication server and the key server on the same computer.

4. A method for enabling a client to access secure information contained in a personal security device, said method comprising:
 at a storage server, receiving from the client a request identifying the personal security device containing secure information;
 in response to receiving said request, sending the personal security device from the storage server to the client;
 at an authentication server, receiving from the client a key query that includes authentication information;
 at the authentication server, authenticating the client based on the received authentication information; and
 as a consequence of authenticating the client, sending a key from a key server to the client, said key for decrypting the personal security device to access the secure information.

5. The method of claim 4, wherein the personal security device contains information necessary to make a secure network connection between a network client and a network server.

6. The method of claim 4, wherein the personal security device contains information necessary to make a secure virtual private network connection.

7. The method of claim 4, wherein authenticating involves validating said authentication information.

8. The method of claim 4, wherein the received authentication information includes a time-based authentication code.

9. The method of claim 4, wherein the key query identifies the personal security device.

10. The method of claim 4, wherein authenticating the client involves:
 in response to receiving the key query, sending the client an authentication challenge; and
 receiving at the authentication server a response from the client to the authentication challenge, said response including said authentication information.

11. The method of claim 4, further comprising implementing the storage server and the authentication server on the same computer.

12. The method of claim 4, further comprising implementing the authentication server and the key server on the same computer.

13. The method of claim 4, wherein the personal security device contains a cryptographic key.

14. The method of claim 4, wherein the personal security device contains a password.

15. The method of claim 4, wherein the personal security device contains private or secret information selected from a group consisting of a medical record, contact information, a personal identification number, biometric information, a transaction record, and a map revealing a location of a resource.

16. The method of claim 4, wherein sending the key to the client involves transmitting the key through a connection to a computer network.

17. The method of claim 16, wherein the network connection is unencrypted.

18. The method of claim 16, wherein the network connection is encrypted.

19. The method of claim 16, wherein the computer network is the Internet.

20. The method of claim 4, wherein the received authentication information includes a single-use code.

21. The method of claim 4, wherein the received authentication information includes a event-based code.

22. The method of claim 4, wherein the received authentication information includes biometric information.

23. A method implemented by a client for accessing secure information, said method comprising:
 receiving a personal security device from a third party, said personal security device containing the secure information;
 sending a key request including authentication information to an authentication server;
 in response to sending the authentication information to the authentication server, receiving from a key server a key for decrypting the personal security device; and
 with the received key, decrypting the personal security device to access the secure information.

24. The method of claim 23, wherein the personal security device contains information necessary to make a secure network connection between a network client and a network server.

25. The method of claim 23, wherein the personal security device contains information necessary to make a secure virtual private network connection.

26. The method of claim 23, wherein receiving the personal security device involves receiving a smartcard that contains the personal security device stored thereon.

27. The method of claim 23, further comprising storing the received key in a volatile memory.

28. The method of claim 23, wherein said key request identifies the personal security device.

29. The method of claim 23, further comprising sending information to a storage server identifying the personal security device, and wherein receiving the personal security device from the third party involves receiving the identified personal security device from the storage server.

30. The method of claim 23, wherein sending the key request and authentication information comprises, in response to sending the key request, receiving from the authentication server an authentication challenge and responding to the authentication challenge with the authentication information.

31. The method of claim 23, further comprising, after decrypting the personal security device, completely erasing the received key from all client memory.

32. The method of claim 23, further comprising, after accessing the secure information, completely erasing the decrypted personal security device and the secure information from all client memory.

33. The method of claim 23, wherein the personal security device contains a cryptographic key.

34. The method of claim 23, wherein the personal security device contains a password.

35. The method of claim 23, wherein receiving the key from the key server involves receiving the key through a connection to a computer network.

36. The method of claim 35, wherein the network connection is unencrypted.

37. The method of claim 35, wherein the network connection is encrypted.

38. The method of claim 35, wherein the computer network is the Internet.

39. The method of claim 23, further comprising generating a single-use code and wherein the authentication information comprises the single-use code.

40. The method of claim 23, further comprising generating a event-based code and wherein the authentication information comprises the event-based code.

41. The method of claim 23, further comprising generating biometric information and wherein the authentication information comprises the biometric information.

42. The method of claim 23, further comprising using an authentication token to generate the authentication information.

43. The method of claim 42, wherein the authentication token is a hardware device independent of the client.

44. The method of claim 42, wherein the authentication token is connected to the client.

45. The method of claim 42, wherein the authentication token is software running on the client.

46. The method of claim 42, wherein the authentication token is software running on a processor independent of the client.

47. The method of claim 23, wherein receiving the encrypted personal security device involves receiving the personal security device as an electronic communication over a network.

* * * * *